July 20, 1954  L. R. GRAVES  2,684,105
METHOD AND MEANS FOR POSITIONING NUTS
Filed Nov. 25, 1952
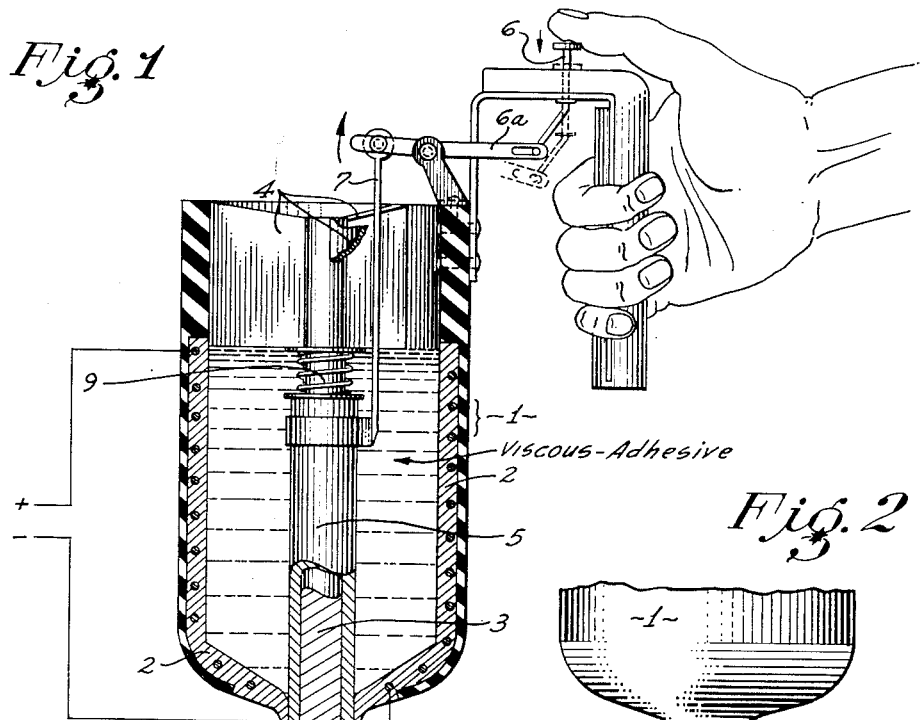
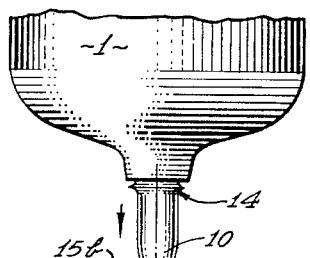
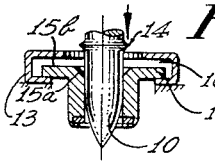
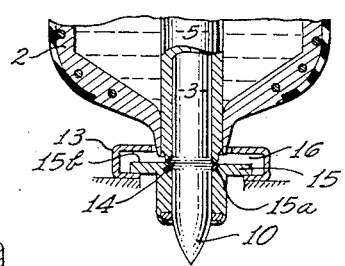
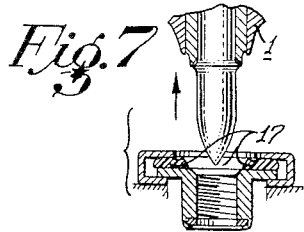
INVENTOR:
Loinel R. Graves
By Herbert E. Metcalf
His Patent Attorney Patented July 20, 1954

2,684,105

UNITED STATES PATENT OFFICE 2,684,105

METHOD AND MEANS FOR POSITIONING NUTS

Loinel R. Graves, Hollywood, Calif., assignor to Northrop Aircraft, Inc., Hawthorne, Calif., a corporation of California Application November 25, 1952, Serial No. 322,514

14 Claims. (Cl. 154—1.6)

My invention relates to devices used for positioning members having apertures therein and ejecting a fluid adhesive for retaining said position of the members.

In structural work it sometimes becomes necessary to both align and maintain the alignment of members having bores therein.

An example of such a requirement comes in the use of floating anchor or gang channel nut assemblies for securing members where one side of the combination is inaccessible. Should it be desired to pass a bolt through the bores of the respective members and into a floating nut constrained in a channel or plate it is necessary that the bolt be provided with a relatively smooth passageway through all the respective bores. Under present day conditions the channel assembly is riveted in place and the members to be fastened to it are then positioned accordingly. It is highly probable that the floating nut will shift in the channel during the riveting process so that the axis of the nut and that of the respective channel hole will be out of alignment, in some cases so much so, that an entering bolt may buck up against the nut plate itself rather than passing through the threaded hole of the nut. The described condition may be obviated by first aligning the axes of the floating nut and its respective channel hole and then tacking the nut plate in position with respect to the channel. Thus positioned, the channel assembly may then be riveted in place. It is to be noted that the channel assembly is used as the fastening means to dispense with the need for close tolerances in the positioning and size of the bores. Therefore, a bolt, inserted through a bore which is slightly out of alignment with the bore of the nut, will engage the nut at its chamfered base and drive the tacked nut plate laterally so as to render the respective axes of the bores coincident.

It is, therefore, a general object of my invention to provide a means for positioning the axis of a floatable locking member having a bore therein with that of a respective channel bore axis and tentatively securing the member in said position.

A further object of my invention is to provide a rapid means for securing many such floating nuts in position within such channels.

The invention need not be restricted to the structural field and many other uses and objects for it will become apparent from the subsequent disclosure wherein the combination effect of a device for alignment of bore axes and position tacking may be utilized.

In broad terms my invention employs a pilot member for alignment of members having apertures therein and an ejector for depositing a small globule of molten plastic or other adhesive for "tacking" or temporarily positioning the members.

For a complete disclosure of my invention, a detailed description of a preferred form thereof will now be given in connection with the accompanying drawings forming a part of the specification wherein:

Figure 1 is a sectional view of the assembled device showing the operator's hand on an operating button.

Figure 2 shows a pilot member in relation to a channel assembly prior to passage from the channel bore to the misaligned nut bore.

Figure 3 shows a segment of the pilot engaging the chamfered portion of the nut bore and about to drive the nut plate laterally in the channel.

Figure 4 shows the pilot extended through the channel bore and the nut bore and thus rendering their respective axes coincident.

Figure 5 is a partial section view showing a sleeve-like control member in its cutoff position after the axes are brought into coincidence.

Figure 6 is a partial section of my invention in its relation to a floating nut assembly wherein a globule of molten plastic has just been deposited in the space between the channel and the nut plate.

Figure 7 is a cross section of my invention showing the nut plate tacked in place in the channel after the pilot is removed therefrom.

Referring in detail to the figures, molten plastic, preferably cellulose, is placed in a retaining vessel 1, and maintained in its molten state by an electrically heated wall 2. An electrically heated core 3, at about 320° F., is centered in the cylinder by means of stabilizing elements 4 welded to the wall 2 and the core 3, and surrounded by a slidable sleeve 5. The sleeve 5 is actuated in an upward direction by depressing a handle button 6 connected to one end of a lever 6a, pivoted on the upper edge of the vessel, an upward movement of the other end of the lever 6a causes a linking arm 7 attached to the sleeve, to rise. The position shown in Figure 6 is considered the open position since the molten plastic is allowed to flow by gravity into the narrow passageways 8 through an entrance opening 8b which is larger than the exit orifice 8a. Further flow of the fluid is precluded due to the viscosity of the molten plastic, and the narrowness of the orifice 8a, the temperature being retained at approximately 320° F. A spring 9 is placed between the top of the sleeve 5 and the bottom of the stabilizing elements 4 and is compressed by the upward force of the sleeve 5. On release of the handle button 6 the spring 9 forces the sleeve 5 downward and thus ejects the viscous molten plastic from the narrow passageways 8. The lower end 10 or pilot of the core 3 is conically shaped so that it will align the nut plate axis 11 and the bore axis 12 of the channel 13. The conical end 10 is flared outwardly to provide a shoulder 14 which engages with and holds down the nut plate 15 thus leaving a space 16 between the channel 13 and nut plate 15 for depositing a globule 17 of the ejected molten plastic. The molten plastic will then solidify in the channel space 16 due to the temperature differential between the retaining vessel 1, at approximately 320° F., and the gang channel nut assembly at room temperature, resulting in the tacking of the nut plate 15 in position in the channel assembly. The channel assembly is then riveted in place and the members to be fastened are placed in position. A bolt is inserted into their respective bores. The rounded forward end of the bolt is now able to make contact with the chamfered edge 15a of the hole in the nut plate 15 and drive it laterally, if necessary, within the limits of the diameter of the channel hole, so as to align the nut axis 11 and the bolt axis. It is to be noted that the diameter of the hole in the channel 13 of the channel assembly is larger than the bores of said members thus allowing for any misalignment, and hence avoiding the necessity of very close hole and position tolerances. Therefore, it is sufficient to merely tack the nut plate 15 in position in the channel assembly so as to insure the contact of the rounded forward end of the bolt at the chamfered edge 15a of the nut plate 15. If the parts were not tacked as described the nut plate 15 might slide in the channel assembly, when the latter was riveted in position. As a consequence, an entering bolt might strike the flat portion 15b of the nut plate 15 and be precluded from an easy entrance into the nut of the plate 15.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A device for positioning members having apertures therein, and for tacking said members in place with said apertures in alignment, comprising: a retaining vessel having an orifice at its base, and adapted to hold an adhesive material in liquid condition; means for regulating flow of said adhesive material from said vessel through said orifice, said means being provided with a pilot member effective to align said members to be positioned, said pilot member being so formed as to guide the flow of said adhesive material into crevices between said members to be positioned, said adhesive material tentatively securing said members in place.

2. A device for positioning members having apertures therein and for tacking said members in place with said apertures in alignment comprising: a retaining vessel adapted to hold a viscous adhesive material in liquid condition, said vessel having a heated wall; a core coaxially positioned within said vessel and having a pilot member integral thereto at its base, said pilot member protruding said vessel externally and being so formed as to be effective to align said apertures; means effective to heat the internal portion of said core, the base of said internal core portion in conjunction with the vessel walls most closely adjacent thereto, defining a narrow passageway with an entry opening of larger size than its exit opening; means for controlling the flow of said fluid into said passageway, the viscosity of the fluid and size of the passage mouth precluding flow under gravity therefrom; and means for ejecting said fluid from said passageway.

3. A device in accordance with claim 2 further characterized by the fact that said core is coaxially positioned in the said vessel by means of stabilizing elements extending from said vessel wall to said core.

4. A device in accordance with claim 3 further characterized by the fact that said vessel wall and core are electrically heated, and heat retaining insulation means are mounted on said wall.

5. A device in accordance with claim 4 and in which the means for control and ejectment of said fluid comprise: a tubular member positioned on said core and slidable with respect thereto, a means for raising said member on said core, and a force producing means for exerting a downward force on said tubular member when the latter is in a raised position, said viscous fluid gravitating into said passageway when said tubular member is in the raised position due to the relatively large entry opening, and, upon release of the raising means, being ejected by the downward thrust of said tubular member actuated by said force producing means.

6. A device in accordance with claim 5 further characterized by the fact that said force producing means comprise a compression spring located between the stabilizing elements and top of said tubular member, and said raising means having linkage arranged between said sleeve and a handle button which, when depressed, actuates said linkage to raise said tubular member.

7. In combination with a floating anchor nut assembly, a device for positioning members having apertures therein and for tacking said members in place with said apertures in alignment comprising: a retaining vessel having a heated wall, said vessel adapted to hold a viscous adhesive material in liquid condition; a core coaxially positioned with said vessel and having a pilot member integral thereto at its base, said pilot member protruding through said vessel externally, and so formed as to be capable of aligning the nut axis and the hole axis in the channel, the internal portion of said core being heated, the base of said internal core portion, in conjunction with the vessel wall defining a narrow passageway with an entry opening of larger size than its exit opening; means for controlling the flow of said fluid into said passageway, the viscosity of said fluid and the small opening at the mouth of said passageway precluding gravitation of said fluid therefrom; and means for ejecting said fluid from said passageway laterally over the opposition of said viscosity force into the channel space between the floating nut and its supporting anchor assembly, said fluid solidifying and securing said nut and channel in position.

8. In combination with a floating anchor nut assembly a device in accordance with claim 7 further characterized by the fact that said core is coaxially positioned by means of stabilizing elements extending from said vessel to said core.

9. In combination with a floating anchor nut assembly a device for positioning members having apertures therein and for tacking said members in place with said apertures in alignment comprising: a retaining vessel adapted to hold a viscous adhesive material in liquid condition and having an electrically heated wall, said wall being insulated on the outer surface; a core coaxially positioned with said vessel and having a pilot member integral thereto at its base, said pilot member protruding through said vessel externally and so formed as to be capable of alignment of bores, the internal portion of said core being heated, the base of said internal core portion, in conjunction with the vessel wall defining a narrow passageway; means for controlling the flow of said fluid into said passageway, the viscosity of said fluid and the small opening at the mouth of said passageway precluding gravitation of said fluid therefrom; and means for ejecting said fluid from said passageway laterally, over the opposition of said viscosity force into the channel space between the floating nut and its supporting anchor assembly, said fluid solidifying and securing said nut and channel in position.

10. In combination with a floating anchor nut assembly a device in accordance with claim 9 further characterized by the fact that said means for control and ejectment of said fluid comprise: a tubular member positioned on said core and slidable with respect thereto, a means for raising said member on said core, and a force producing means for exerting a downward force on said tubular member when the latter is in a raised position, said viscous fluid gravitating into said passageway when said tubular member is in the raised position due to the relatively large entry opening, and, upon release of the raising means, being ejected by the downward thrust of said tubular member actuated by said force producing means.

11. In combination with a floating anchor nut assembly a device in accordance with claim 10 further characterized by the fact that said tube is a sleeve, said force producing means is a compression spring located between the stabilizing elements on top of it and sleeve on its bottom, and said raising means consists of an arm linkage attached to said sleeve and a handle button which, when depressed, actuates said arm linkage upwards.

12. A method for positioning and tacking members having apertures therein which comprises: heating a viscous adhesive to its molten state, placing said adhesive in a containing vessel, aligning the axes of said apertures while concomitantly depressing one member so as to create a small crevice between them, regulating the flow of said adhesive while simultaneously guiding it into said crevice, and allowing said adhesive to cool.

13. A method according to claim 12 further characterized by flowing said viscous adhesive from said vessel through a passageway sufficiently narrow to prevent flow under gravity of the adhesive and ejecting said adhesive under pressure as required.

14. A method for positioning and tacking members having apertures therein which comprises the steps of: placing a hardenable liquid adhesive in a retaining vessel; aligning the axes of said apertures while concomitantly depressing one member so as to create a small crevice between said members; regulating the flow of said adhesive while simultaneously guiding it into said crevice; and allowing said adhesive to set.

References Cited in the file of this patent

UNITED STATES PATENTS

| Number | Name | Date |
| --- | --- | --- |
| 369,125 | Rand | Aug. 30, 1887 |
| 853,769 | Caviglia | May 14, 1907 |
| 873,941 | Irving | Dec. 17, 1907 |
| 1,122,280 | Kempshall | Dec. 29, 1914 |
| 1,130,906 | Johnson et al. | Mar. 9, 1915 |
| 1,167,420 | Marcuse | Jan. 11, 1916 |
| 1,646,614 | Frye et al. | Oct. 25, 1927 |
| 1,663,077 | Hallock | Mar. 20, 1928 |
| 2,132,783 | Goldmark | Oct. 11, 1938 |
| 2,151,604 | Kushima | Mar. 21, 1939 |
| 2,251,284 | Kamborian | Aug. 5, 1941 |
| 2,272,780 | Schweyer | Feb. 10, 1942 |
| 2,288,248 | Long | June 30, 1942 |
| 2,290,363 | Stirton | July 21, 1942 |
| 2,419,592 | Richardson | Apr. 29, 1947 |
| 2,576,393 | Flanagan | Nov. 27, 1951 |